United States Patent
Fujii et al.

(10) Patent No.: US 11,814,049 B2
(45) Date of Patent: Nov. 14, 2023

(54) VEHICLE DRIVING SUPPORT DEVICE, VEHICLE DRIVING SUPPORT METHOD, AND VEHICLE DRIVING SUPPORT COMPUTER PROGRAM

(71) Applicant: Toyota Jidosha Kabushiki Kaisha, Toyota (JP)

(72) Inventors: Kohsuke Fujii, Toyota (JP); Naoki Nishimura, Nagoya (JP); Toshihiro Nakatani, Nisshin (JP); Hiroaki Ito, Toyota (JP); Takeshi Matsumura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 17/390,041

(22) Filed: Jul. 30, 2021

(65) Prior Publication Data
US 2022/0105938 A1 Apr. 7, 2022

(30) Foreign Application Priority Data
Oct. 5, 2020 (JP) ................................ 2020-168188

(51) Int. Cl.
*B60W 30/18* (2012.01)
*B60W 10/04* (2006.01)
*B60W 10/18* (2012.01)
*B60W 50/14* (2020.01)

(52) U.S. Cl.
CPC ............ *B60W 30/18* (2013.01); *B60W 10/04* (2013.01); *B60W 10/18* (2013.01); *B60W 50/14* (2013.01);
(Continued)

(58) Field of Classification Search
CPC ................ B60W 10/04; B60W 10/18; B60W 2050/146; B60W 2520/06;
(Continued)

(56) References Cited

U.S. PATENT DOCUMENTS 9,466,212 B1 * 10/2016 Stumphauzer, II .... H04N 7/183
9,786,154 B1 * 10/2017 Potter .................... B60R 25/04
(Continued)

FOREIGN PATENT DOCUMENTS

CN 106556403 A 4/2017
CN 108688683 A 10/2018
(Continued)

*Primary Examiner* — Babar Sarwar
(74) *Attorney, Agent, or Firm* — Dinsmore & Shohl LLP

(57) ABSTRACT

A vehicle driving support device performs driving support of supporting a driver's driving of a host vehicle based on traffic information. The vehicle driving support device performs a first process of acquiring traffic information associated with traveling of the host vehicle as first traffic information from forward information of the host vehicle detected by a forward information detecting device, performs a second process of acquiring traffic information associated with traveling of the host vehicle out of traffic information stored in a database as second traffic information by comparing a current position of the host vehicle with map data stored in the database, and performs the driving support based on the first traffic information even when the second traffic information is acquired until a predetermined first condition is satisfied when the first traffic information has been acquired.

18 Claims, 9 Drawing Sheets

(52) U.S. Cl.
CPC ... *B60W 2050/146* (2013.01); *B60W 2520/06* (2013.01); *B60W 2520/10* (2013.01); *B60W 2540/10* (2013.01); *B60W 2540/12* (2013.01); *B60W 2552/05* (2020.02); *B60W 2554/40* (2020.02); *B60W 2556/60* (2020.02)

(58) Field of Classification Search
CPC ......... B60W 2520/10; B60W 2540/10; B60W 2540/12; B60W 2552/05; B60W 2554/40; B60W 2555/60; B60W 2556/60; B60W 30/18; B60W 50/14
See application file for complete search history.

(56) References Cited

U.S. PATENT DOCUMENTS

| | | | |
|---|---|---|---|
| 2012/0068860 A1* | 3/2012 | Popovic | G08G 1/096783 340/905 |
| 2012/0095646 A1* | 4/2012 | Ghazarian | G01S 19/17 340/905 |
| 2017/0010117 A1* | 1/2017 | Oh | G01C 21/3602 |
| 2017/0092125 A1* | 3/2017 | Fujimaki | G08G 1/09626 |
| 2017/0129401 A1* | 5/2017 | Matsuoka | B60R 1/00 |
| 2018/0174446 A1* | 6/2018 | Wang | G08G 1/096716 |
| 2018/0239971 A1 | 8/2018 | Kim et al. | |
| 2018/0247532 A1 | 8/2018 | Koyama et al. | |
| 2019/0056230 A1* | 2/2019 | Hatav | G08G 1/09626 |
| 2019/0295409 A1* | 9/2019 | Akahane | G08G 1/0112 |
| 2020/0026302 A1* | 1/2020 | Wolcott | G05D 1/0088 |
| 2020/0369291 A1* | 11/2020 | Daniel | B60W 50/14 |
| 2021/0027077 A1* | 1/2021 | Hayashi | G06V 10/98 |
| 2022/0165151 A1* | 5/2022 | Jumonji | G08G 1/0133 |

FOREIGN PATENT DOCUMENTS

| | | | | |
|---|---|---|---|---|
| JP | 2017-045194 A | | 3/2017 | |
| JP | 2017-062696 A | | 3/2017 | |
| WO | WO-2020243484 A1 * | 12/2020 | | ......... B60W 30/146 |

* cited by examiner

FIG. 3

VEHICLE DRIVING SUPPORT DEVICE, VEHICLE DRIVING SUPPORT METHOD, AND VEHICLE DRIVING SUPPORT COMPUTER PROGRAM

CROSS-REFERENCE TO RELATED APPLICATION

This application claims priority to Japanese Patent Application No. 2020-168188 filed on Oct. 5, 2020, incorporated herein by reference in its entirety.

BACKGROUND

1. Technical Field

The disclosure relates to a vehicle driving support device, a vehicle driving support method, and a vehicle driving support computer program.

2. Description of Related Art

A vehicle driving support device having a function of recognizing a speed limit that applies to a host vehicle from information of an image of a road sign in front of the host vehicle which is captured by a camera (camera image information) and notifying a driver of the speed limit that applies to the host vehicle by displaying the recognized speed limit on a display is known. In addition, a vehicle driving support device that acquires a speed limit applying to a host vehicle from information of a speed limit acquired from a car navigation system (car navigation information) in addition to camera image information and displays the acquired speed limit on a display is also known (for example, see Japanese Unexamined Patent Application Publication No. 2017-62696 (JP 2017-62696 A)).

SUMMARY

When a speed limit cannot be accurately recognized from the camera image information, there is a likelihood that the speed limit acquired from the car navigation information will be more accurate than the speed limit recognized from the camera image information. On the other hand, when the car navigation information is old or information of a road sign which is temporarily installed at a roadwork site or the like is not stored as car navigation information in the car navigation system, there is a likelihood that the speed limit recognized from the camera image information will be more accurate than the speed limit acquired from the car navigation information.

In this way, the speed limit recognized from the camera image information may be more accurate or the speed limit acquired from the car navigation information may be more accurate depending on circumstances. This is true of traffic information such as traffic regulations in addition to the speed limit.

When driving support in the form of displaying traffic information associated with traveling of the host vehicle at that time on the display or driving support in the form of assisting with a driver's operation of driving the host vehicle in consideration of traffic information associated with traveling of the host vehicle at that time is performed, appropriate driving support cannot be performed without recognizing information that is more appropriate as traffic information.

The disclosure provides a vehicle driving support device, a vehicle driving support method, and a vehicle driving support computer program that can perform driving support based on traffic information which is appropriate as traffic information associated with traveling of a host vehicle at that time.

According to an aspect of the disclosure, there is provided a vehicle driving support device including a control unit configured to perform driving support of supporting a driver's driving of a host vehicle based on traffic information associated with traveling of the host vehicle. The vehicle driving support device according to the aspect of the disclosure further includes a forward information detecting device that detects forward information of the host vehicle.

The control unit is configured to perform a first process of acquiring traffic information associated with traveling of the host vehicle at that time as first traffic information from the information detected by the forward information detecting device and to perform a second process of acquiring traffic information associated with traveling of the host vehicle at that time out of traffic information stored in a database as second traffic information by comparing a current position of the host vehicle with map data stored in the database. The control unit is configured to perform the driving support based on the first traffic information even when the second traffic information is acquired between after the first traffic information has been acquired and until a predetermined first condition is satisfied when the first traffic information has been acquired.

Since the second traffic information is acquired from a database, the second traffic information is reliably acquired as long as traffic information associated with traveling of the host vehicle at that point is stored in the database. However, even when a road sign or the like is temporarily installed at a road roadwork site, information on such a road sign or the like may not be stored in the database or may not be immediately stored in the database. Accordingly, there is a likelihood that traffic information indicated by such a road sign or the like which is temporarily installed will not be acquired as the second traffic information from the database. When details of the traffic information have changed (for example, when a speed limit has changed from 40 km/h to 60 km/h), the change in traffic information is not immediately reflected in the database. Accordingly, the second traffic information acquired from the database when details of the traffic information are changed is not likely to be appropriate.

On the other hand, the first traffic information is acquired from detection information detected by the forward information detecting device. Accordingly, when a road sign or the like is temporarily installed, traffic information indicated by the road sign or the like is acquired as the first traffic information from the detection information and the acquired first traffic information is appropriate as traffic information associated with traveling of the host vehicle at that time. Even when details of the traffic information have changed, the changed traffic information is acquired as the first traffic information from the detection information and thus the acquired first traffic information is appropriate as the traffic information associated with traveling of the host vehicle at that time. However, even when the host vehicle approaches the road sign or the like, the first traffic information may not be acquired for the reasons of detection accuracy of the detection information from the forward information detecting device, acquisition reliability of the first traffic information based on the detection information, or the like. In general, road signs or the like are installed at intervals of a predetermined distance or less. Accordingly, when the host vehicle travels for a predetermined period, traffic information of the road sign or the like should be continually newly acquired as the first traffic information. However, when the first traffic information has not been newly acquired in spite of traveling of the host vehicle for a predetermined period, the first traffic information which should have been inherently acquired may not have been acquired. At this time, when driving support based on the previously acquired first traffic information continues to be performed, the driving support may not be based on the traffic information inherently associated with traveling of the host vehicle at that time.

In this way, the acquisition reliability of the second traffic information is higher than that of the first traffic information, but the appropriateness in acquired details of the first traffic information is better than that of the second traffic information. In this way, the first traffic information and the second traffic information have advantages and disadvantages.

With the vehicle driving support device according to the disclosure, when the first traffic information is acquired, the first traffic information continues to be used for the driving support even when the second traffic information is acquired for a predetermined period (that is, until the predetermined first condition is satisfied). Accordingly, it is possible to perform driving support based on traffic information which is appropriate as traffic information associated with traveling of a host vehicle at that time.

In the vehicle driving support device according to the disclosure, the control unit may be configured not to store the acquired second traffic information even when the second traffic information is acquired through the second process between after the first traffic information has been acquired and until the predetermined first condition is satisfied.

With this configuration, since traffic information which is not used (second traffic information) is not stored, it is possible to curb unnecessary increase in control load.

The control unit may be configured to perform the driving support based on the second traffic information when the predetermined first condition is satisfied.

With this configuration, after a predetermined period has elapsed, traffic information (second traffic information) acquired from the database is used for the driving support. Accordingly, it is possible to perform driving support based on information which is appropriate as traffic information associated with traveling of the host vehicle at that time.

The predetermined first condition may be, for example, a condition that a distance over which the host vehicle has traveled without newly acquiring the first traffic information after the first traffic information has been acquired reaches a predetermined first distance.

In general, road signs indicating the same type of traffic information and the like are installed at every intersection or installed at intervals of a predetermined distance or less. Accordingly, when new first traffic information has not been acquired in spite of traveling of the host vehicle for a predetermined distance, there is a likelihood that the first traffic information used for the driving support at that time will not be appropriate. With the vehicle driving support device according to the disclosure, the first traffic information is used for the driving support only until the host vehicle travels a predetermined distance after the first traffic information has been acquired. Accordingly, it is possible to perform driving support based on information which is appropriate as traffic information associated with traveling of the host vehicle at that time.

For example, the predetermined first distance may be set to a distance longer when the host vehicle is traveling on an expressway than when the host vehicle is traveling on a general road.

In general, installation intervals between road signs indicating the same type of traffic information or the like are longer on an expressway than on a general road. With the vehicle driving support device according to the disclosure, the predetermined distance is set to be longer on an expressway than on a general road. Accordingly, when the host vehicle is traveling on a general road and on an expressway, driving support based on the first traffic information is performed until the host vehicle travels an appropriate distance in which the reliability of the first traffic information is maintained.

The predetermined first distance may be set to a distance corresponding to a distance between neighboring points at which two pieces of first traffic information of the same type have been acquired.

With this configuration, the predetermined distance is set based on past data of the installation interval between road signs or the like indicating the same type of traffic information. Accordingly, driving support based on the first traffic information is performed until the host vehicle travels an appropriate distance in which the reliability of the first traffic information is maintained.

According to another aspect of the disclosure, there is provided a vehicle driving support method of performing driving support of supporting a driver's driving of a host vehicle based on traffic information associated with traveling of the host vehicle. The vehicle driving support method includes: a step of detecting forward information of the host vehicle and performing a first process of acquiring traffic information associated with traveling of the host vehicle at that time as first traffic information from the detected information; a step of performing a second process of acquiring traffic information associated with traveling of the host vehicle at that time out of traffic information stored in a database as second traffic information by comparing a current position of the host vehicle with map data stored in the database; and a step of performing the driving support based on the first traffic information even when the second traffic information is acquired between after the first traffic information has been acquired and until a predetermined first condition is satisfied when the first traffic information has been acquired.

With this configuration, as described above, it is possible to perform driving support based on traffic information which is appropriate as traffic information associated with traveling of a host vehicle at that time.

A vehicle driving support computer program according to another aspect of the disclosure is a program that performs the vehicle driving support method.

With this configuration, as described above, it is possible to perform driving support based on traffic information which is appropriate as traffic information associated with traveling of a host vehicle at that time.

Constituent elements of the disclosure are not limited to embodiments which will be described later with reference to the accompanying drawings. Other objectives, other features, and additional advantages of the disclosure will be easily understood from the description of the embodiments of the disclosure below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating another operation pattern of the vehicle driving support device according to the embodiment of the disclosure;

DETAILED DESCRIPTION OF EMBODIMENTS

Figure 1:
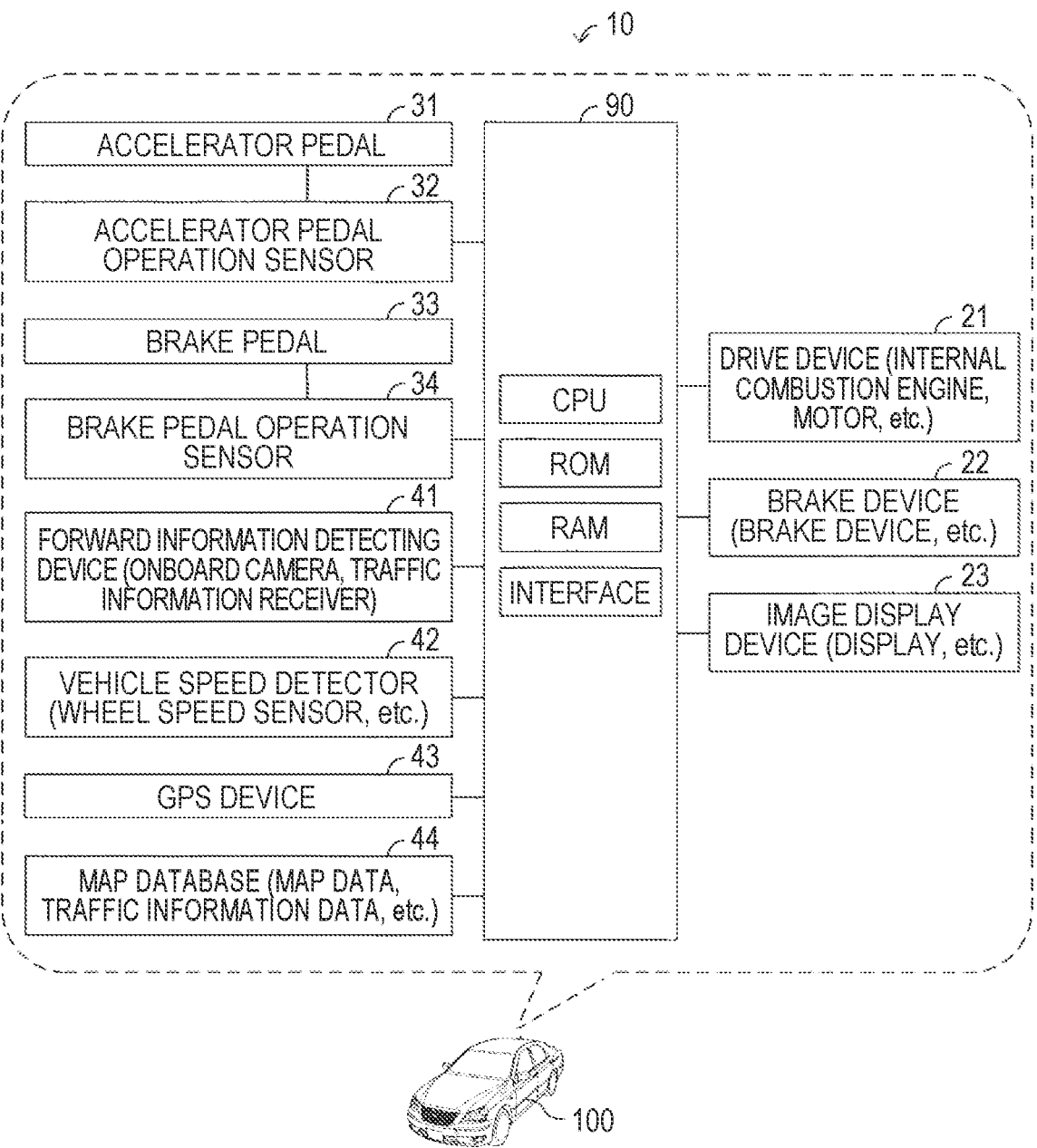
FIG. 1 is a diagram illustrating a vehicle driving support device according to an embodiment of the disclosure and a vehicle in which the vehicle driving support device is mounted.

A vehicle driving support device according to an embodiment of the disclosure will be described with reference to the accompanying drawings. FIG. 1 illustrates a vehicle driving support device 10 according to an embodiment of the disclosure. The vehicle driving support device 10 is mounted in a host vehicle 100.

ECU

The vehicle driving support device 10 includes an electronic control unit (ECU) 90. ECU is an abbreviation of an electronic control unit. The ECU 90 includes a microcomputer as a major component. The microcomputer includes a CPU, a ROM, a RAM, a nonvolatile memory, and an interface. The CPU realizes various functions by executing instructions, programs, or routines stored in the ROM.

Drive Device and the Like

A drive device 21, a brake device 22, and an image display device 23 are mounted in the host vehicle 100.

Drive Device

The drive device 21 is a device that applies a driving force for allowing the host vehicle 100 to travel to the host vehicle 100 and includes, for example, an internal combustion engine and a motor. The drive device 21 is electrically connected to the ECU 90. The ECU 90 can control the driving force which is applied to the host vehicle 100 by controlling the operation of the drive device 21.

Brake Device

The brake device 22 is a device that applies a braking force for braking the host vehicle 100 to the host vehicle 100 and is, for example, a brake. The brake device 22 is electrically connected to the ECU 90. The ECU 90 can control the braking force which is applied to the host vehicle 100 by controlling the operation of the brake device 22.

Image Display Device

The image display device 23 is, for example, a display. The image display device 23 is electrically connected to the ECU 90. The ECU 90 can cause the image display device 23 to display various images.

Forward Information Detecting Device and the Like

An accelerator pedal 31, an accelerator pedal operation sensor 32, a brake pedal 33, a brake pedal operation sensor 34, a forward information detecting device 41, a vehicle speed detector 42, a GPS device 43, and a map database 44 are mounted in the host vehicle 100.

Accelerator Pedal Operation Sensor

The accelerator pedal operation sensor 32 is electrically connected to the ECU 90. The accelerator pedal operation sensor 32 detects an amount of operation of the accelerator pedal 31 and transmits information on the detected amount of operation to the ECU 90. The ECU 90 acquires the amount of operation of the accelerator pedal 31 as an accelerator pedal operation amount AP based on the information. The ECU 90 controls the operation of the drive device 21 based on the accelerator pedal operation amount AP.

Brake Pedal Operation Sensor

The brake pedal operation sensor 34 is electrically connected to the ECU 90. The brake pedal operation sensor 34 detects an amount of operation of the brake pedal 33 and transmits information on the detected amount of operation to the ECU 90. The ECU 90 acquires the amount of operation of the brake pedal 33 as a brake pedal operation amount BP based on the information. The ECU 90 controls the operation of the brake device 22 based on the brake pedal operation amount BP. When the brake pedal operation amount BP is greater than zero, the ECU 90 can recognize that the brake pedal 33 has been operated.

Forward Information Detecting Device

The forward information detecting device 41 is a device that detects forward information (detection information IFd) of the host vehicle 100. The forward information detecting device 41 is, for example, a device such as an onboard camera and a traffic information receiver. The onboard camera detects the detection information IFd in the form of image data by imaging a forward view of the host vehicle 100. The traffic information receiver detects the detection information IFd by receiving radio signals indicating traffic information emitted from a transmitter such as a road-side unit which is installed on a road.

The forward information detecting device 41 is electrically connected to the ECU 90. The forward information detecting device 41 transmits the detection information IFd to the ECU 90. The ECU 90 acquires information (traffic information IF) associated with traveling of the host vehicle 100 at that time from the detection information IFd.

In this embodiment, examples of the traffic information IF (information associated with traveling of the host vehicle 100) include regulations such as a speed limit, guidance such as road guidance, call for attention of a driver, and an instruction for a driver.

When the forward information detecting device 41 is an onboard camera, the ECU 90 acquires traffic information IF indicated by a road sign or the like when a road sign and road markings (a road sign or the like) are recognized from forward image data of the host vehicle 100 which is transmitted from the onboard camera. A road sign is a sign that is installed on a road side or above a road, and a road marking is a marking that is provided on a road surface. A road sign includes a type of sign (an electrical display type of sign) in which details of traffic information IF are changed depending on circumstances in addition to a type of sign in which details of traffic information IF are not changed.

When the forward information detecting device 41 is a traffic information receiver, the ECU 90 acquires traffic information IF indicated by a radio signal when the traffic information receiver receives the radio signal.

Vehicle Speed Detector

The vehicle speed detector 42 is a device that detects a traveling speed of the host vehicle 100 and is, for example, a wheel speed sensor. The vehicle speed detector 42 is electrically connected to the ECU 90. The vehicle speed detector 42 detects a traveling speed of the host vehicle 100 and transmits information on the traveling speed to the ECU 90. The ECU 90 acquires the traveling speed of the host vehicle 100 as a vehicle speed SPD based on the information. The ECU 90 acquires a distance (traveling distance D) at which the host vehicle 100 has traveled based on the vehicle speed SPD and an elapsed time.

GPS Device

The GPS device 43 is electrically connected to the ECU 90. The GPS device 43 receives GPS signals and transmits the received GPS signals to the ECU 90. The ECU 90 can acquire a current position Pnow of the host vehicle 100 based on the GPS signals.

Map Information Database

Map data DTmap and traffic information data DTtrf are stored in the map database 44. The vehicle driving support device 10 may be configured to acquire the map data DTmap and the traffic information data DTtrf from an external database outside the host vehicle 100 in a wireless manner. In this embodiment, the map data DTmap and the traffic information data DTtrf are stored in the map database 44, but the traffic information data DTtrf may be stored in a database which is different from the map database 44.

The map database 44 is electrically connected to the ECU 90. The ECU 90 compares the current position Pnow of the host vehicle 100 with the map data DTmap stored in the map database 44, identifies a point on a map at which the host vehicle 100 is currently traveling, and acquires the traffic information IF associated with traveling of the host vehicle 100 at that point based on the traffic information data DTtrf stored in the map database 44.

Summary of Operation of Vehicle Driving Support Device

The operation of the vehicle driving support device 10 will be described below.

The vehicle driving support device 10 performs driving support of supporting a driver's driving of the host vehicle 100 by providing information which is helpful to the driver's driving of the host vehicle 100 or by automatically performing control associated with traveling of the host vehicle 100. Particularly, the vehicle driving support device 10 performs such driving support based on the traffic information IF associated with traveling of the host vehicle 100 at that time. That is, the vehicle driving support device 10 performs driving support using a method which will be described below. In other words, the vehicle driving support device 10 includes a computer program for performing driving support as will be described below.

For example, driving support is traffic information display of displaying an image indicating traffic information IF on the image display device 23 and is vehicle speed limit control for limiting a driving force which is applied to the host vehicle 100 or applying a braking force to the host vehicle 100 such that the vehicle speed SPD of the host vehicle 100 does not exceed a speed limit when the traffic information IF is a speed limit.

The vehicle driving support device 10 performs a process (first process) of acquiring traffic information IF as first traffic information IF1 from the detection information IFd at intervals of a predetermined time. The vehicle driving support device 10 performs a process (second process) of identifying a position on a map at which the host vehicle 100 is traveling by comparing the current position Pnow of the host vehicle 100 with the map data DTmap and acquiring traffic information IF at the position as second traffic information IF2 from the traffic information data DTtrf at intervals of a predetermined time.

For example, when traffic information IF is acquired from information of a road sign or the like included in the detection information IFd, the information of a road sign or the like is included in the detection information IFd only when the host vehicle 100 approaches the road sign or the like. In other words, the information of a road sign or the like is not always included in the detection information IFd. Accordingly, the first traffic information IF1 may not be acquired even when the first process is performed.

On the other hand, when traffic information IF is acquired from the map database 44, the traffic information data DTtrf correlated with a road at a point at which the host vehicle 100 is traveling is basically stored in the map database 44 and thus the second traffic information IF2 is acquired from the map database 44 by performing the second process.

Therefore, the vehicle driving support device 10 performs driving support as follows.

When first traffic information IF1 is acquired through the first process, the vehicle driving support device 10 starts driving support based on the first traffic information IF1. Accordingly, when driving support based on the second traffic information IF2 is being performed at the time of acquisition of the first traffic information IF1, the vehicle driving support device 10 switches the driving support to driving support based on the first traffic information IF1. When new first traffic information IF1 is acquired while the driving support based on the first traffic information IF1 is being performed, the vehicle driving support device 10 switches the driving support to driving support based on the newly acquired first traffic information IF1. When the first traffic information IF1 is acquired while none of the driving support based on the first traffic information IF1 and the driving support based on the second traffic information IF2 is being performed, the vehicle driving support device 10 starts the driving support based on the first traffic information IF1.

Between after the driving support based on the first traffic information IF1 has been started and until a predetermined first condition C1 is satisfied, the vehicle driving support device 10 continues to perform the driving support based on the first traffic information IF1 without performing the driving support based on the second traffic information IF2 even when the second traffic information IF2 is acquired.

In this embodiment, when the second traffic information IF2 is acquired while the driving support based on the first traffic information IF1 is being performed, the vehicle driving support device 10 is configured not to hold or store the acquired second traffic information IF2. However, when the second traffic information IF2 is acquired while the driving support based on the first traffic information IF1 is being performed, the vehicle driving support device 10 may be configured to hold or store the acquired second traffic information IF2 until new second traffic information IF2 is acquired.

When the predetermined first condition C1 is satisfied after the driving support based on the first traffic information IF1 has been started, the vehicle driving support device 10 ends the driving support based on the first traffic information IF1.

In this embodiment, the predetermined first condition C1 is, a condition that a traveling distance D of the host vehicle 100 (a first traveling distance D1) after the first traffic information IF1 has been acquired in a state in which new first traffic information IF1 is not acquired after the first traffic information IF1 has been acquired reaches a predetermined first distance D1_th or a condition that an elapsed time (a first elapsed time T1) after first traffic information IF1 has been acquired in a state in which new first traffic information IF1 is not acquired after the first traffic information IF1 has been acquired reaches a predetermined first time T1_th.

The predetermined first distance D1_th and the predetermined first time T1_th may be fixed values or may be variable values varying depending on circumstances. For example, distance intervals at which the same type of road signs or road markings are installed are longer on an expressway than on a general road. Therefore, the predetermined first distance D1_th may be set to a distance which is longer when the host vehicle 100 is traveling on an expressway than when the host vehicle 100 is traveling on a general road. The predetermined first time T1_th may be set to a time which is longer when the host vehicle 100 is traveling on an expressway than when the host vehicle 100 is traveling on a general road. Whether the host vehicle 100 is traveling in a general road or an expressway can be determined, for example, based on information stored in the map database 44 or the like.

The distance intervals at which the same type of road signs or road markings are installed differ depending on countries. Therefore, the predetermined first distance D1_th may be set to be longer as the installation intervals in the country in which the host vehicle 100 is traveling become longer. The predetermined first time T1_th may be set to be longer as the installation intervals in the country in which the host vehicle 100 is traveling become longer. In what country the host vehicle 100 is traveling can be determined, for example, based on information stored in the map database 44 or the like.

The predetermined first distance D1_th may be set based on past data of the installation intervals at which the same type of road signs are installed. For example, the predetermined first distance D1_th may be set to be longer as the distance intervals at which the first traffic information IF1 was acquired through the first process become longer. More specifically, the predetermined first distance D1_th may be set to a distance between a point at which first traffic information IF1 has been acquired when the first traffic information IF1 has been acquired and a point at which the first traffic information IF1 was acquired immediately before the first traffic information IF1 has been acquired. Similarly, the predetermined first time T1_th may be set to be longer as the time intervals at which the first traffic information IF1 was acquired through the first process become longer. More specifically, the predetermined first time T1_th may be set to a time which has elapsed after the first traffic information IF1 was acquired immediately before the first traffic information IF1 has been acquired until first traffic information IF1 is acquired when the first traffic information IF1 has been acquired.

The vehicle driving support device 10 starts the driving support based on the second traffic information IF2 when the driving support based on the first traffic information IF1 is not performed, when the driving support based on the first traffic information IF1 ends, or when second traffic information IF2 is acquired through the second process after the driving support based on the first traffic information IF1 has ended.

The vehicle driving support device 10 may be configured to start the driving support based on the second traffic information IF2 when the driving support based on the first traffic information IF1 has ended and the second traffic information IF2 is acquired and held or stored through the second process.

Accordingly, as described above, the vehicle driving support device 10 does not perform the driving support based on the second traffic information IF2 even when the second traffic information IF2 is acquired while the driving support based on the first traffic information IF1 is being performed. The vehicle driving support device 10 switches the driving support to the driving support based on new second traffic information IF2 when the new second traffic information IF2 is acquired while the driving support based on the second traffic information IF2 is being performed. The vehicle driving support device 10 starts the driving support based on the second traffic information IF2 when the second traffic information IF2 is acquired while none of the driving support based on the first traffic information IF1 and the driving support based on the second traffic information IF2 is being performed.

Then, the vehicle driving support device 10 ends the driving support based on the second traffic information IF2 when a predetermined second condition C2 is satisfied after the driving support based on the second traffic information IF2 has been started.

In this embodiment, the predetermined second condition C2 is a condition that a traveling distance D (a second traveling distance D2) of the host vehicle 100 after second traffic information IF2 has been acquired in a state in which none of first traffic information IF1 and new second traffic information IF2 is acquired after the second traffic information IF2 has been acquired reaches a predetermined second distance D2_th or a condition that an elapsed time (a second elapsed time T2) after second traffic information IF2 has been acquired in a state in which none of first traffic information IF1 and new second traffic information IF2 is acquired after the second traffic information IF2 has been acquired reaches a predetermined second time T2_th. In this embodiment, the predetermined first time T1_th and the predetermined second time T2_th are set to the same length of time but may be set to be different from each other.

For example, when driving support is traffic information display (display of an image indicating traffic information IF on the image display device 23) and the first traffic information IF1 and the second traffic information IF2 are speed limits, the traffic information display is performed as follows. The traffic information display which is performed by the vehicle driving support device 10 includes various patterns, and some representative patterns thereof will be described below.

Display Pattern 1

Figure 2:
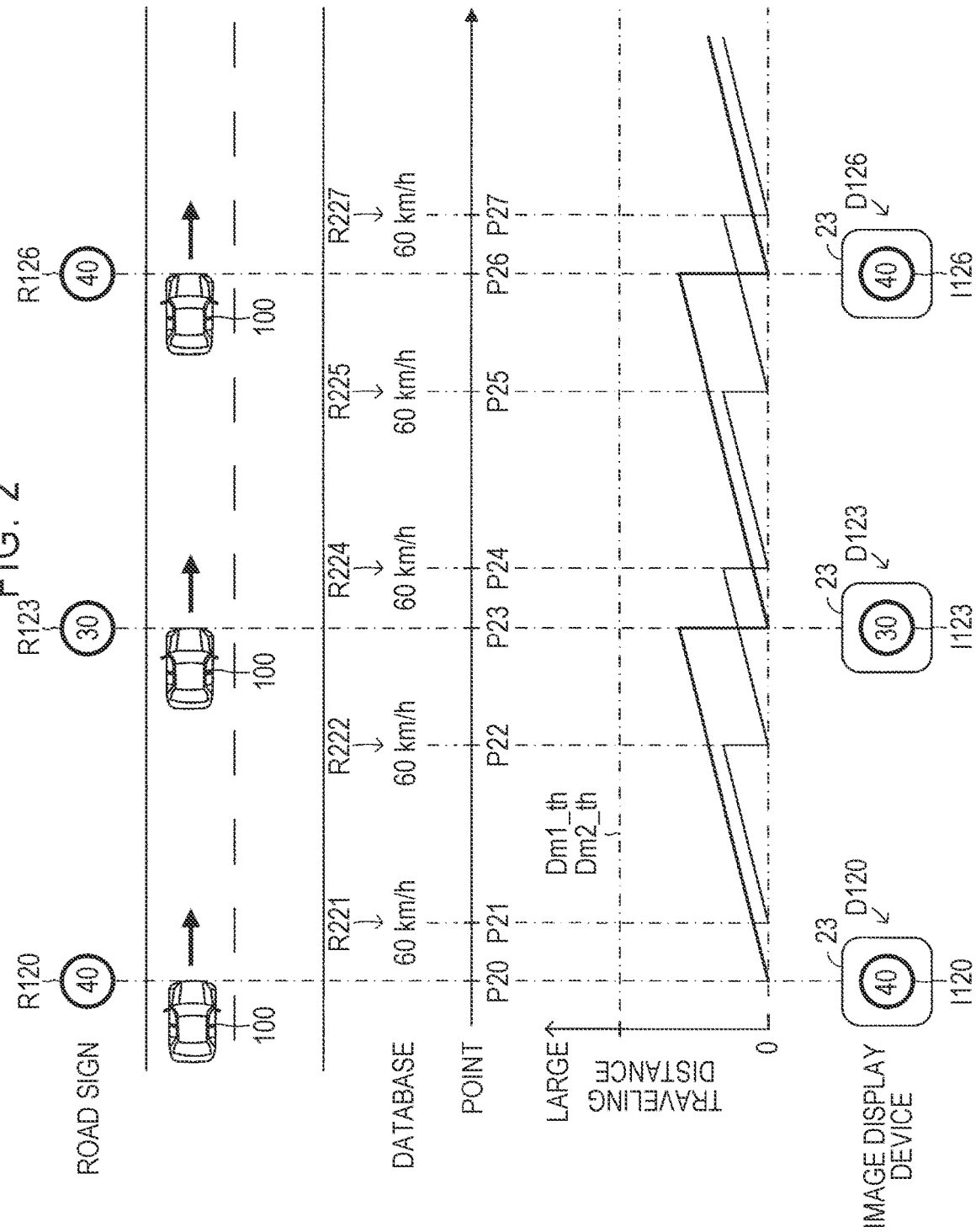
FIG. 2 is a diagram illustrating an operation pattern of the vehicle driving support device according to an embodiment of the disclosure.

As illustrated in FIG. 2, when a road sign R120 indicating a speed limit of 40 km/h is detected by the forward information detecting device 41 when the host vehicle 100 reaches a point P20, the speed limit of 40 km/h is acquired as a sign speed limit (first traffic information IF1) and sign speed limit display D120 of 40 km/h (display of an image I120 indicating a speed limit of 40 km/h on the image display device 23) is started when the host vehicle 100 passes through the detected road sign R120.

Thereafter, when the host vehicle 100 arrives at a point P21 and a point P22, a speed limit R221 and a speed limit R222 of 60 km/h are acquired as data speed limits (second traffic information IF2) from the map database 44, but since the traveling distance D (the first traveling distance D1) of the host vehicle 100 after the sign speed limit of 40 km/h has been acquired at the point P20 does not reach the predetermined first distance D1_th, data speed limit display of 60 km/h (display of an image indicating a speed limit of 60 km/h on the image display device 23) is not performed and the sign speed limit display D120 of 40 km/h continues to be performed.

Thereafter, when a road sign R123 indicating a speed limit of 30 km/h is detected by the forward information detecting device 41 when the host vehicle 100 reaches a point P23 and the speed limit of 30 km/h is acquired as a sign speed limit (first traffic information IF1), the speed limit display (display of an image indicating a speed limit on the image display device 23) is switched from the sign speed limit display D120 of 40 km/h to a sign speed limit display D123 of 30 km/h (display of an image I123 indicating a speed limit of 30 km/h on the image display device 23) when the host vehicle 100 passes through the detected road sign R123.

Thereafter, when the host vehicle 100 arrives at a point P24 and a point P25, a speed limit R224 and a speed limit R225 of 60 km/h are acquired as data speed limits (second traffic information IF2) from the map database 44, but since the traveling distance D (the first traveling distance D1) of the host vehicle 100 after the sign speed limit of 30 km/h has been acquired at the point P23 does not reach the predetermined first distance D1_th, data speed limit display of 60 km/h is not performed and the sign speed limit display D123 of 30 km/h continues to be performed.

Thereafter, when a road sign R126 indicating a speed limit of 40 km/h is detected by the forward information detecting device 41 when the host vehicle 100 reaches a point P26 and the speed limit of 40 km/h is acquired as a sign speed limit (first traffic information IF1), the speed limit display is switched from the sign speed limit display D123 of 30 km/h to a sign speed limit display D126 of 40 km/h (display of an image I126 indicating a speed limit of 40 km/h on the image display device 23) when the host vehicle 100 passes through the detected road sign R126.

Thereafter, when the host vehicle 100 arrives at a point P27, a speed limit R227 of 60 km/h is acquired as a data speed limit (second traffic information IF2) from the map database 44, but since the traveling distance D (the first traveling distance D1) of the host vehicle 100 after the sign speed limit of 40 km/h has been acquired at the point P26 does not reach the predetermined first distance D1_th, data speed limit display of 60 km/h is not performed and the sign speed limit display D126 of 40 km/h continues to be performed.

Display Pattern 2

Figure 3:
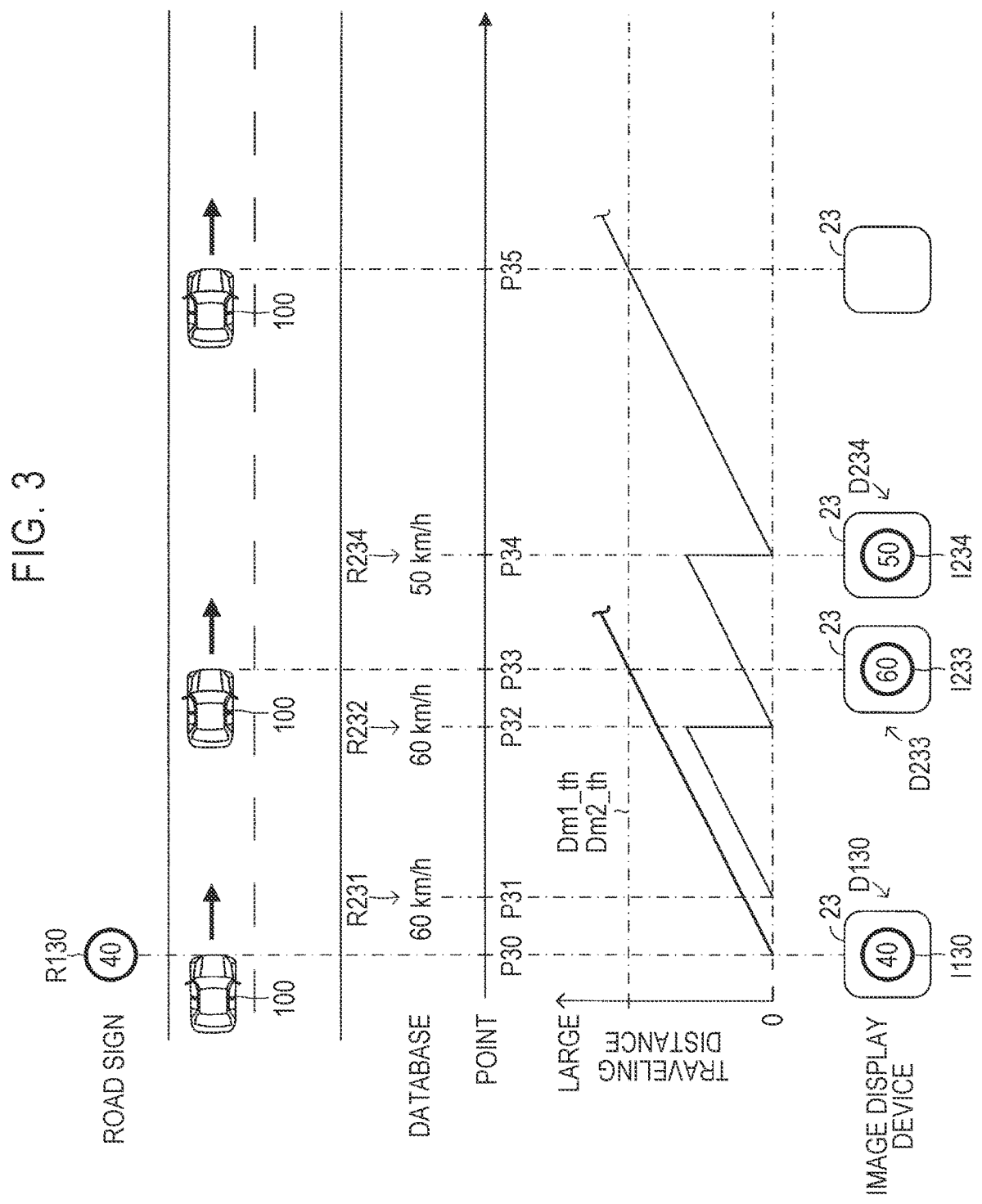

As illustrated in FIG. 3, when a road sign R130 indicating a speed limit of 40 km/h is detected by the forward information detecting device 41 when the host vehicle 100 reaches a point P30, the speed limit of 40 km/h is acquired as a sign speed limit (first traffic information IF1) and sign speed limit display D130 of 40 km/h (display of an image I130 indicating a speed limit of 40 km/h on the image display device 23) is started when the host vehicle 100 passes through the detected road sign R130.

Thereafter, when the host vehicle 100 arrives at a point P31 and a point P32, a speed limit R231 and a speed limit R232 of 60 km/h are acquired as data speed limits (second traffic information IF2) from the map database 44, but since the traveling distance D (the first traveling distance D1) of the host vehicle 100 after the sign speed limit of 40 km/h has been acquired at the point P30 does not reach the predetermined first distance D1_th, data speed limit display of 60 km/h is not performed and the sign speed limit display D130 of 40 km/h continues to be performed.

Thereafter, the traveling distance D (the first traveling distance D1) of the host vehicle 100 after the sign speed limit of 40 km/h has been acquired at the point P30 reaches the predetermined first distance D1_th at a point P33. On the other hand, the traveling distance D (the second traveling distance D2) of the host vehicle 100 after the data speed limit R232 of 60 km/h has been acquired at the point P32 does not reach the predetermined second distance D2_th at the point P33. Accordingly, when the host vehicle 100 reaches the point P33, the speed limit display is switched from the sign speed limit display D130 of 40 km/h to a data speed limit display D233 of 60 km/h (display of an image I233 indicating a speed limit of 60 km/h on the image display device 23).

Thereafter, a speed limit R234 of 50 km/h is acquired as a data speed limit (second traffic information IF2) from the map database 44 when the host vehicle 100 reaches a point P34 and a new sign speed limit (first traffic information IF1) is not acquired while the host vehicle 100 is traveling from the point P33 to the point P34. Accordingly, the speed limit display is switched from the data speed limit display D233 of 60 km/h to a data speed limit display D234 of 50 km/h (display of an image I234 indicating a speed limit of 50 km/h on the image display device 23).

Thereafter, since the traveling distance D (the second traveling distance D2) of the host vehicle 100 after the data speed limit R234 of 50 km/h has been acquired at the point P34 in a state in which none of a sign speed limit and a data speed limit is acquired reaches the predetermined second distance D2_th at a point P35, the predetermined second condition C2 is satisfied. Accordingly, the data speed limit display D234 of 50 km/h ends when the host vehicle 100 arrives at the point P35. As a result, an image indicating a speed limit is not displayed on the image display device 23.

Display Pattern 3

Figure 4:
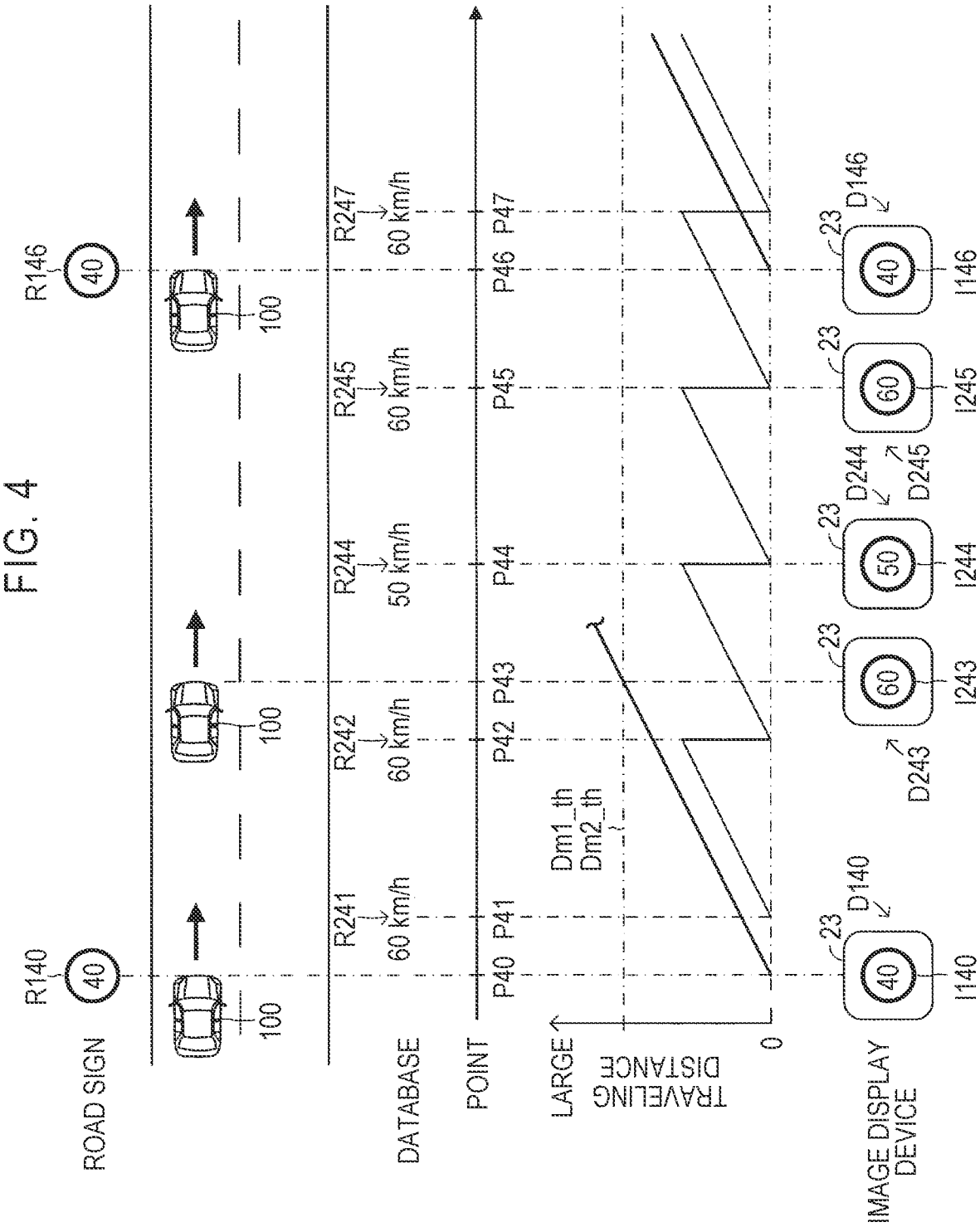
FIG. 4 is a diagram illustrating another operation pattern of the vehicle driving support device according to the embodiment of the disclosure.

As illustrated in FIG. 4, when a road sign R140 indicating a speed limit of 40 km/h is detected by the forward information detecting device 41 when the host vehicle 100 reaches a point P40, the speed limit of 40 km/h is acquired as a sign speed limit (first traffic information IF1) and sign speed limit display D140 of 40 km/h (display of an image I140 indicating a speed limit of 40 km/h on the image display device 23) is started when the host vehicle 100 passes through the detected road sign R140.

Thereafter, when the host vehicle 100 arrives at a point P41 and a point P42, a speed limit R241 and a speed limit R242 of 60 km/h are acquired as data speed limits (second traffic information IF2) from the map database 44, but since the traveling distance D (the first traveling distance D1) of the host vehicle 100 after the sign speed limit of 40 km/h has been acquired at the point P40 does not reach the predetermined first distance D1_th, data speed limit display of 60 km/h is not performed and the sign speed limit display D140 of 40 km/h continues to be performed.

Thereafter, the traveling distance D (the first traveling distance D1) of the host vehicle 100 after the sign speed limit of 40 km/h has been acquired at the point P40 reaches the predetermined first distance D1_th at a point P43. Accordingly, the predetermined first condition C1 is satisfied. On the other hand, the traveling distance D (the second traveling distance D2) of the host vehicle 100 after the data speed limit R242 of 60 km/h has been acquired at the point P42 does not reach the predetermined second distance D2_th at the point P43. Accordingly, when the host vehicle 100 reaches the point P43, the speed limit display is switched from the sign speed limit display D140 of 40 km/h to a data speed limit display D243 of 60 km/h (display of an image I243 indicating a speed limit of 60 km/h on the image display device 23).

Thereafter, a speed limit R244 of 50 km/h is acquired as a data speed limit (second traffic information IF2) from the map database 44 when the host vehicle 100 reaches a point P44 and a new sign speed limit is not acquired while the host vehicle 100 is traveling from the point P43 to the point P44. Accordingly, the speed limit display is switched from the data speed limit display D243 of 60 km/h to a data speed limit display D244 of 50 km/h (display of an image I244 indicating a speed limit of 50 km/h on the image display device 23).

Thereafter, a speed limit R245 of 60 km/h is acquired as a data speed limit (second traffic information IF2) from the map database 44 when the host vehicle 100 reaches a point P45 and a new sign speed limit is not acquired while the host vehicle 100 is traveling from the point P44 to the point P45. Accordingly, the speed limit display is switched from the data speed limit display D244 of 50 km/h to a data speed limit display D245 of 60 km/h (display of an image I245 indicating a speed limit of 60 km/h on the image display device 23).

Thereafter, when a road sign R146 indicating a speed limit of 40 km/h is detected by the forward information detecting device 41 when the host vehicle 100 reaches a point P46, and the speed limit of 40 km/h is acquired as a sign speed limit (first traffic information IF1), the speed limit display is switched from the data speed limit display D245 of 60 km/h to a sign speed limit display D146 of 40 km/h (display of an image I146 indicating a speed limit of 40 km/h on the image display device 23) when the host vehicle 100 passes through the detected road sign R146.

Thereafter, when the host vehicle 100 arrives at a point P47, a speed limit R247 of 60 km/h is acquired as a data speed limit (second traffic information IF2) from the map database 44, but since the traveling distance D (the first traveling distance D1) of the host vehicle 100 after the sign speed limit of 40 km/h has been acquired at the point P46 does not reach the predetermined first distance D1_th, data speed limit display of 60 km/h is not performed and the sign speed limit display D146 of 40 km/h continues to be performed.

Display Pattern 4

Figure 5:
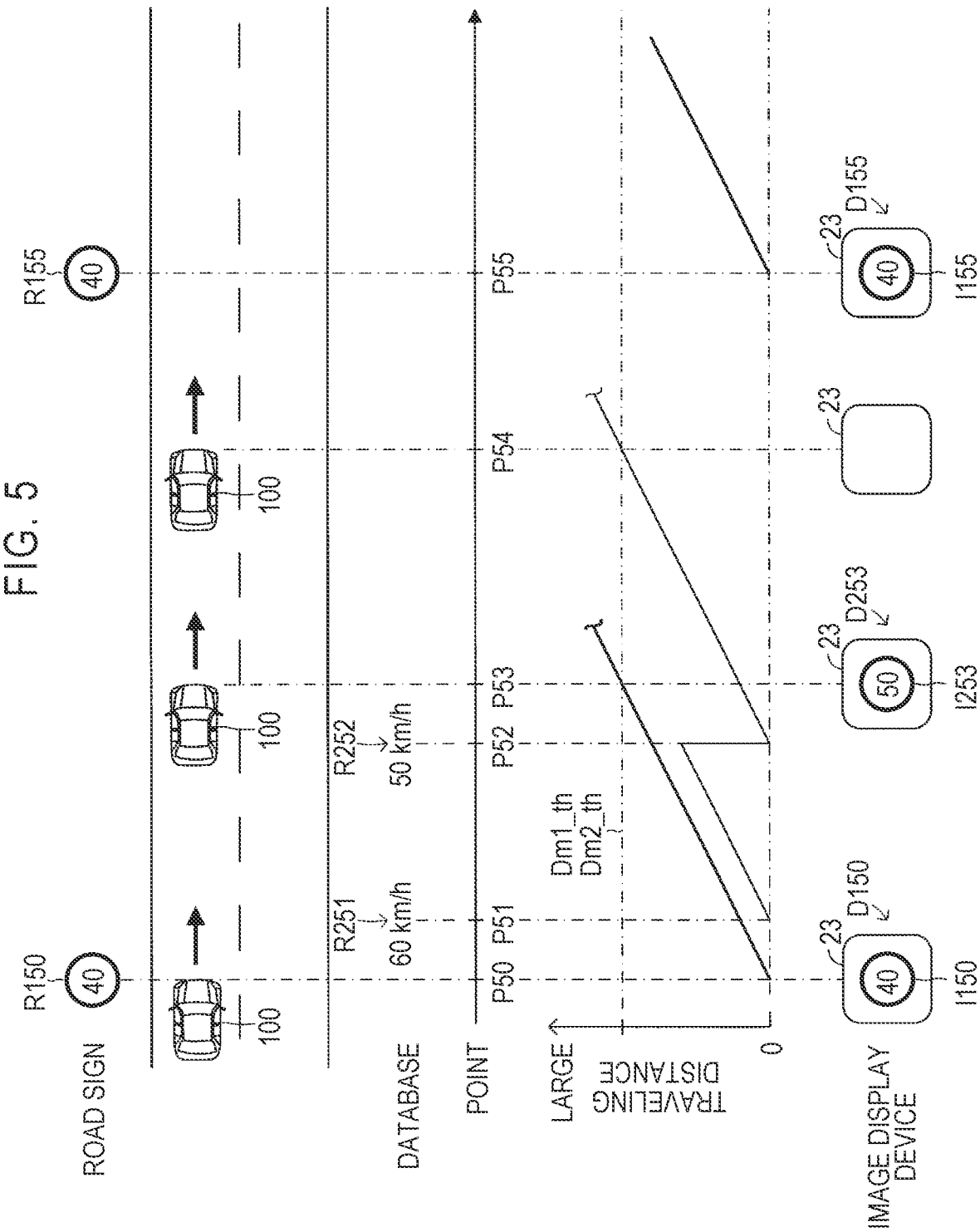
FIG. 5 is a diagram illustrating another operation pattern of the vehicle driving support device according to the embodiment of the disclosure.

As illustrated in FIG. 5, when a road sign R150 indicating a speed limit of 40 km/h is detected by the forward information detecting device 41 when the host vehicle 100 reaches a point P50, the speed limit of 40 km/h is acquired as a sign speed limit (first traffic information IF1) and sign speed limit display D150 of 40 km/h (display of an image I150 indicating a speed limit of 40 km/h on the image display device 23) is started when the host vehicle 100 passes through the detected road sign R150.

Thereafter, when the host vehicle 100 arrives at a point P51 and a point P52, a speed limit R251 of 60 km/h and a speed limit R252 of 50 km/h are acquired as data speed limits (second traffic information IF2) from the map database 44, but since the traveling distance D (the first traveling distance D1) of the host vehicle 100 after the sign speed limit of 40 km/h has been acquired at the point P50 does not reach the predetermined first distance D1_th, data speed limit display of 60 km/h is not performed and the sign speed limit display D150 of 40 km/h continues to be performed.

Thereafter, the traveling distance D (the first traveling distance D1) of the host vehicle 100 after the sign speed limit of 40 km/h has been acquired at the point P50 reaches the predetermined first distance D1_th at a point P53. On the other hand, the traveling distance D (the second traveling distance D2) of the host vehicle 100 after the data speed limit R252 of 50 km/h has been acquired at the point P52 does not reach the predetermined second distance D2_th at the point P53. Accordingly, when the host vehicle 100 reaches the point P53, the speed limit display is switched from the sign speed limit display D150 of 40 km/h to a data speed limit display D253 of 50 km/h (display of an image I253 indicating a speed limit of 50 km/h on the image display device 23).

Thereafter, since the traveling distance D (the second traveling distance D2) of the host vehicle 100 after the data speed limit R252 of 50 km/h has been acquired at the point P52 in a state in which none of a sign speed limit and a data speed limit is acquired reaches the predetermined second distance D2_th at a point P54, the predetermined second condition C2 is satisfied. Accordingly, the data speed limit display D253 of 50 km/h ends when the host vehicle 100 arrives at the point P54. As a result, an image indicating a speed limit is not displayed on the image display device 23.

Thereafter, when a road sign R155 indicating a speed limit of 40 km/h is detected by the forward information detecting device 41 when the host vehicle 100 reaches a point P55, the speed limit of 40 km/h is acquired as a sign speed limit (first traffic information IF1) and a sign speed limit display D155 of 40 km/h (display of an image I155 indicating a speed limit of 40 km/h on the image display device 23) is started when the host vehicle 100 passes through the detected road sign R155.

Display Pattern 5

Figure 6:
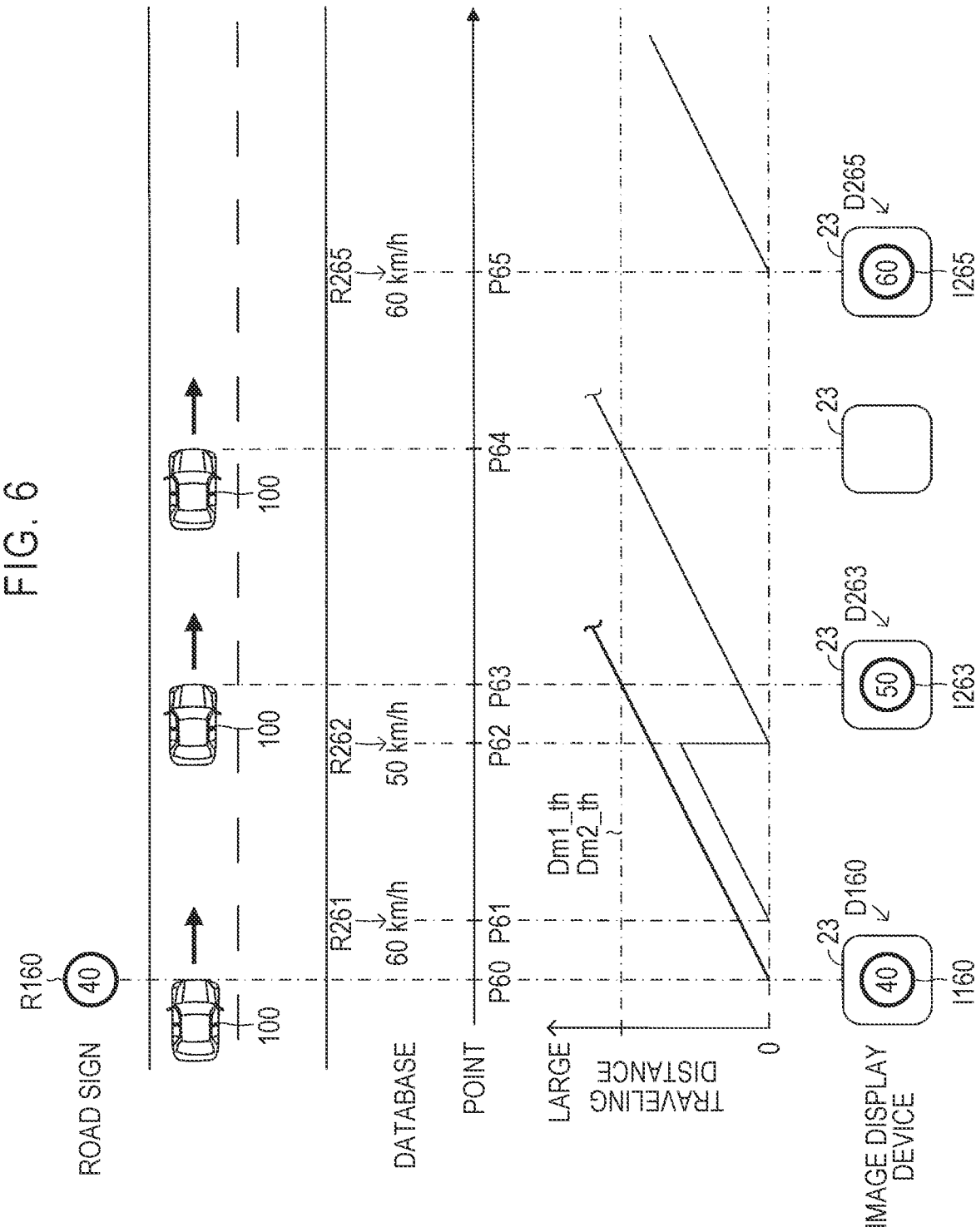
FIG. 6 is a diagram illustrating another operation pattern of the vehicle driving support device according to the embodiment of the disclosure.

As illustrated in FIG. 6, when a road sign R160 indicating a speed limit of 40 km/h is detected by the forward information detecting device 41 when the host vehicle 100 reaches a point P60, the speed limit of 40 km/h is acquired as a sign speed limit (first traffic information IF1) and sign speed limit display D160 of 40 km/h (display of an image I160 indicating a speed limit of 40 km/h on the image display device 23) is started when the host vehicle 100 passes through the detected road sign R160.

Thereafter, when the host vehicle 100 arrives at a point P61 and a point P62, a speed limit R261 of 60 km/h and a speed limit R262 of 50 km/h are acquired as data speed limits (second traffic information IF2) from the map database 44, but since the traveling distance D (the first traveling distance D1) of the host vehicle 100 after the sign speed limit of 40 km/h has been acquired at the point P60 does not reach the predetermined first distance D1_th, none of data speed limit display of 60 km/h and data speed limit display of 50 km/h is performed and the sign speed limit display D160 of 40 km/h continues to be performed.

Thereafter, the traveling distance D (the first traveling distance D1) of the host vehicle 100 after the sign speed limit of 40 km/h has been acquired at the point P60 reaches the predetermined first distance D1_th at a point P63. On the other hand, the traveling distance D (the second traveling distance D2) of the host vehicle 100 after the data speed limit R262 of 50 km/h has been acquired at the point P62 does not reach the predetermined second distance D2_th at the point P63. Accordingly, when the host vehicle 100 reaches the point P63, the speed limit display is switched from the sign speed limit display D160 of 40 km/h to the data speed limit display D263 of 50 km/h (display of an image I263 indicating a speed limit of 50 km/h on the image display device 23).

Thereafter, since the traveling distance D (the second traveling distance D2) of the host vehicle 100 after the data speed limit R262 of 50 km/h has been acquired at the point P62 in a state in which none of a sign speed limit and a data speed limit is acquired reaches the predetermined second distance D2_th at a point P64, the predetermined second condition C2 is satisfied. Accordingly, the data speed limit display D263 of 50 km/h ends when the host vehicle 100 arrives at the point P64. As a result, an image indicating a speed limit is not displayed on the image display device 23.

Thereafter, when a road sign R265 indicating a speed limit of 60 km/h is detected as a data speed limit (second traffic information IF2) from the map database 44 when the host vehicle 100 reaches a point P65, a data speed limit display D265 of 60 km/h (display of an image I265 indicating a speed limit of 60 km/h on the image display device 23) is started.

Advantageous Effects

Since the second traffic information IF2 is acquired from the map database 44, the second traffic information IF2 is reliably acquired as long as traffic information IF associated with traveling of the host vehicle 100 at that point is stored in the map database 44. However, even when a road sign or the like is temporarily installed at a roadwork site, information on such a road sign or the like may not be stored in the map database 44 or may not be immediately stored in the map database 44. Accordingly, there is a likelihood that traffic information IF indicated by such a road sign or the like which is temporarily installed will not be acquired as the second traffic information IF2 from the map database 44. When details of the traffic information IF have changed (for example, when a speed limit has changed from 40 km/h to 60 km/h), the change of the traffic information IF is not immediately reflected in the map database 44. Accordingly, the second traffic information IF2 acquired from the map database 44 when details of the traffic information IF are changed is not likely to be appropriate.

On the other hand, the first traffic information IF1 is acquired from the detection information IFd detected by the forward information detecting device 41. Accordingly, when a road sign or the like is temporarily installed, traffic information IF indicated by the road sign or the like is acquired as the first traffic information IF1 from the detection information IFd and the acquired first traffic information IF1 is appropriate as traffic information IF associated with traveling of the host vehicle 100 at that time. Even when details of the traffic information IF have changed, the changed traffic information IF is acquired as the first traffic information IF1 from the detection information IFd and thus the acquired first traffic information IF1 is appropriate as the traffic information IF associated with traveling of the host vehicle 100 at that time. However, even when the host vehicle 100 approaches the road sign or the like, the first traffic information IF1 may not be acquired for the reasons of detection accuracy of the detection information IFd from the forward information detecting device 41, acquisition reliability of the first traffic information IF1 based on the detection information IFd, or the like. In general, road signs or the like are installed at intervals of a predetermined distance or less. Accordingly, when the host vehicle 100 travels for a predetermined period, traffic information IF indicated by the road sign or the like should be continually newly acquired as the first traffic information IF1. However, when the first traffic information IF1 has not been newly acquired in spite of traveling of the host vehicle 100 for a predetermined period, the first traffic information IF1 which should have been inherently acquired may not have been acquired. At this time, when driving support based on the previously acquired first traffic information IF1 is being performed, the driving support may not be based on the traffic information IF inherently associated with traveling of the host vehicle 100 at that time.

In this way, the acquisition reliability of the second traffic information IF2 is higher than that of the first traffic information IF1, but the appropriateness in acquired details of the first traffic information IF1 is better than that of the second traffic information IF2. In this way, the first traffic information IF1 and the second traffic information IF2 have advantages and disadvantages.

In consideration of these circumstances, with the vehicle driving support device 10, first, when the first traffic information IF1 is acquired, the acquired first traffic information IF1 is appropriate as the traffic information IF associated with traveling of the host vehicle 100 at that time and thus the first traffic information IF1 continues to be used for the driving support even when the second traffic information IF2 is acquired for a predetermined period. When new first traffic information IF1 is not acquired in a predetermined period after the first traffic information IF1 has been acquired, the second traffic information IF2 is used for the driving support. By switching the traffic information IF which is used for the driving support in this way, it is possible to perform driving support based on traffic information IF which is appropriate as the traffic information IF associated with traveling of the host vehicle 100 as a whole.

Specific Operations

Figure 7:
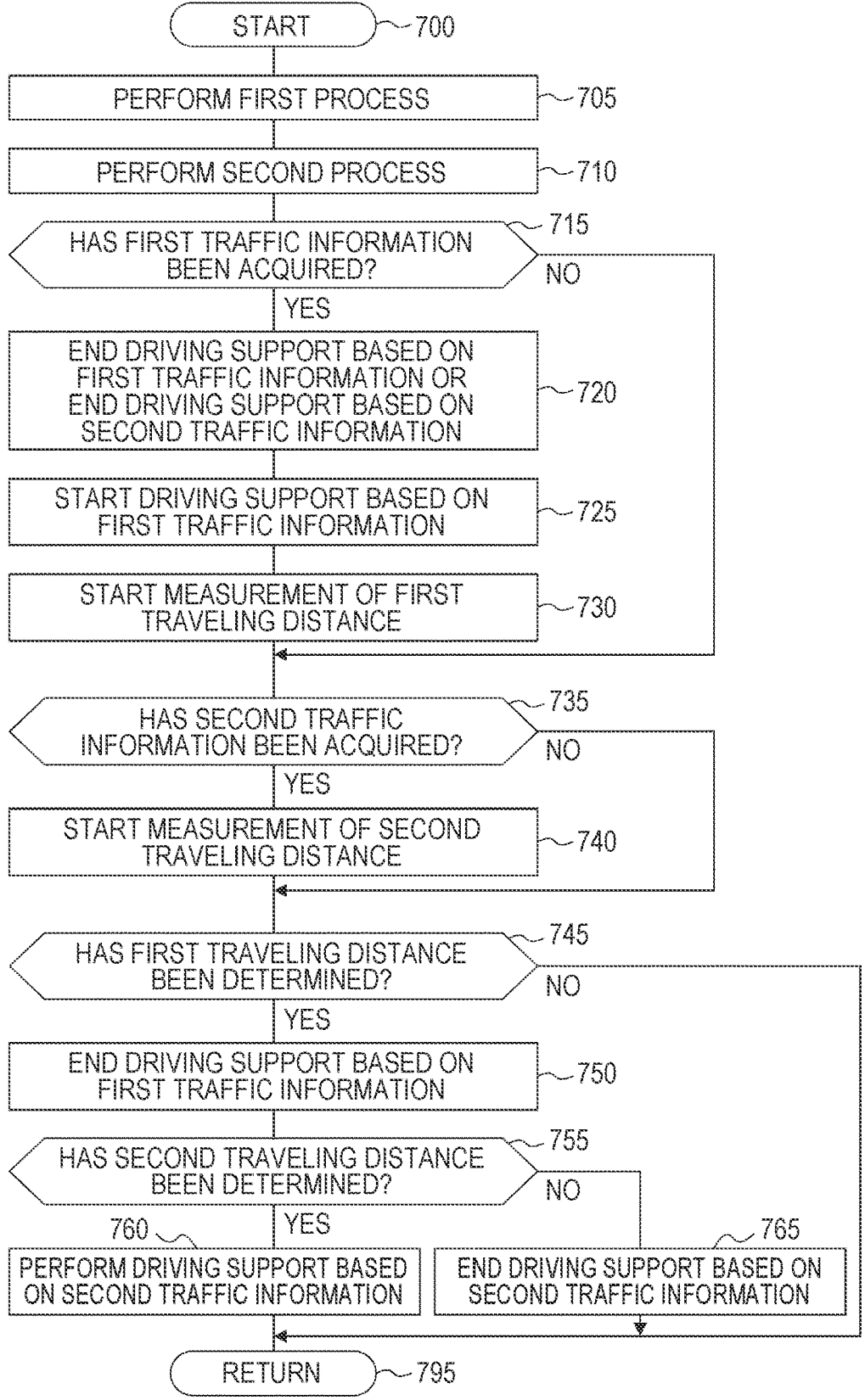
FIG. 7 is a flowchart illustrating a routine which is performed by the vehicle driving support device according to the embodiment of the disclosure.

Specific operations of the vehicle driving support device 10 will be described below. The CPU of the ECU 90 of the vehicle driving support device 10 performs a routine illustrated in FIG. 7 at predetermined time intervals. Accordingly, at a predetermined timing, the CPU starts the routine from Step 700 in FIG. 7, causes the routine to proceed to Step 705, and performs the first process. Subsequently, the CPU causes the routine to proceed to Step 710 and performs the second process. Subsequently, the CPU causes the routine to proceed to Step 715 and determines whether first traffic information IF1 has been acquired.

When the determination result of Step 715 is "YES," the CPU causes the routine to proceed to Step 720, ends driving support based on the first traffic information IF1 when the driving support based on the first traffic information IF1 is being performed at that time, and ends driving support based on the second traffic information IF2 when the driving support based on the second traffic information IF2 is being performed at that time. The CPU maintains the state in which driving support is not being performed when none of the driving support based on the first traffic information IF1 and the driving support based on the second traffic information IF2 is performed at the time at which the routine proceeds to Step 720.

Subsequently, the CPU causes the routine to proceed to Step 725 and starts the driving support based on the first traffic information IF1 newly acquired in Step 705. Subsequently, the CPU causes the routine to proceed to Step 730 and starts measurement of the first traveling distance D1. The first traveling distance D1 is a traveling distance D of the host vehicle 100 after the first traffic information IF1 has been newly acquired in Step 705. Subsequently, the CPU causes the routine to proceed to Step 735.

On the other hand, when the determination result of Step 715 is "NO," the CPU causes the routine to proceed directly to Step 735.

When the routine proceeds to Step 735, the CPU determines whether second traffic information IF2 has been acquired.

When the determination result of Step 735 is "YES," the CPU causes the routine to proceed to Step 740 and starts measurement of the second traveling distance D2. The second traveling distance D2 is a traveling distance D of the host vehicle 100 after the second traffic information IF2 has been newly acquired in Step 710. Subsequently, the CPU causes the routine to proceed to Step 745.

On the other hand, when the determination result of Step 735 is "NO," the CPU causes the routine to proceed directly to Step 745.

When the routine proceeds to Step 745, the CPU determines whether the first traveling distance D1 is equal to or greater than the predetermined first distance D1_th.

When the determination result of Step 745 is "YES," the CPU causes the routine to proceed to Step 750 and ends the driving support based on the first traffic information IF1 which is being performed at that time. When the driving support based on the first traffic information IF1 is not being performed at that time, the CPU maintains the state in which the driving support based on the first traffic information IF1 is not being performed. Subsequently, the CPU causes the routine to proceed to Step 755 and determines whether the second traveling distance D2 is less than the predetermined second distance D2_th.

When the determination result of Step 755 is "YES," the CPU causes the routine to proceed to Step 760 and performs the driving support based on the second traffic information IF2. At this time, when the driving support based on the second traffic information IF2 is being performed already, the driving support based on the second traffic information IF2 continues to be performed. Thereafter, the CPU causes the routine to proceed to Step 795 and temporarily ends this routine.

On the other hand, when the determination result of Step 755 is "NO," the CPU causes the routine to proceed to Step 765 and ends the driving support based on the second traffic information IF2 which is being performed at that time. When the driving support based on the second traffic information IF2 is not being performed at that time, the CPU maintains the state in which the driving support based on the second traffic information IF2 is not being performed. Thereafter, the CPU causes the routine to proceed to Step 795 and temporarily ends this routine.

When the determination result of Step 745 is "NO," the CPU causes the routine to proceed directly to Step 795 and temporarily ends this routine.

The specific operations of the vehicle driving support device 10 have been described hitherto.

Figure 8:
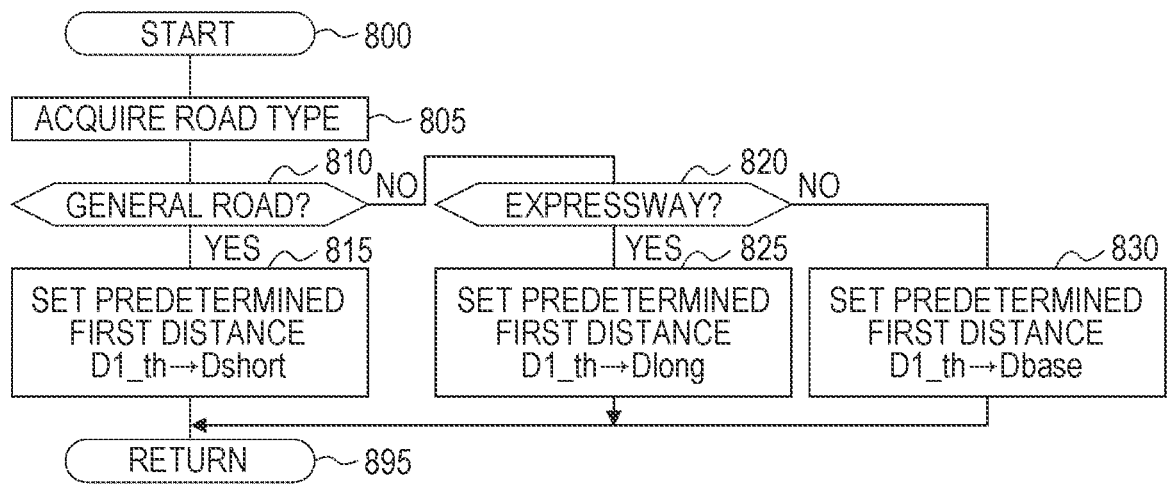
FIG. 8 is a flowchart illustrating a routine which is performed by the vehicle driving support device according to the embodiment of the disclosure.

When the vehicle driving support device 10 is configured to set the predetermined first distance D1_th depending on a road type, the CPU performs a routine illustrated in FIG. 8 at predetermined time intervals. In this case, at a predetermined timing, the CPU starts the routine from Step 800 in FIG. 8, causes the routine to proceed to Step 805, and acquires a type of a road in which the host vehicle 100 is traveling. Subsequently, the CPU causes the routine to proceed to Step 810 and determines whether the road in which the host vehicle 100 is traveling is a general road based on the type of the road acquired in Step 805.

When the determination result of Step 810 is "YES," the CPU causes the routine to proceed to Step 815 and sets a distance Dshort stored in advance as a predetermined first distance D1_th for a general road as the predetermined first distance D1_th. Thereafter, the CPU causes the routine to proceed to Step 895 and temporarily ends this routine.

On the other hand, when the determination result of Step 810 is "NO," the CPU causes the routine to proceed to Step 820 and determines whether the road in which the host vehicle 100 is traveling is an expressway based on the type of the road acquired in Step 805.

When the determination result of Step 820 is "YES," the CPU causes the routine to proceed to Step 825 and sets a distance Dlong stored in advance as a predetermined first distance D1_th for an expressway as the predetermined first distance D1_th. Thereafter, the CPU causes the routine to proceed to Step 895 and temporarily ends this routine.

On the other hand, when the determination result of Step 820 is "NO" (that is, when the type of the road in which the host vehicle 100 is traveling is neither a general road nor an expressway or when the type of the road cannot be determined to be a general road or an expressway), the CPU causes the routine to proceed to Step 830 and sets a distance Dbase stored in advance as a standard predetermined first distance D1_th as the predetermined first distance D1_th. Thereafter, the CPU causes the routine to proceed to Step 895 and temporarily ends this routine.

Figure 9:
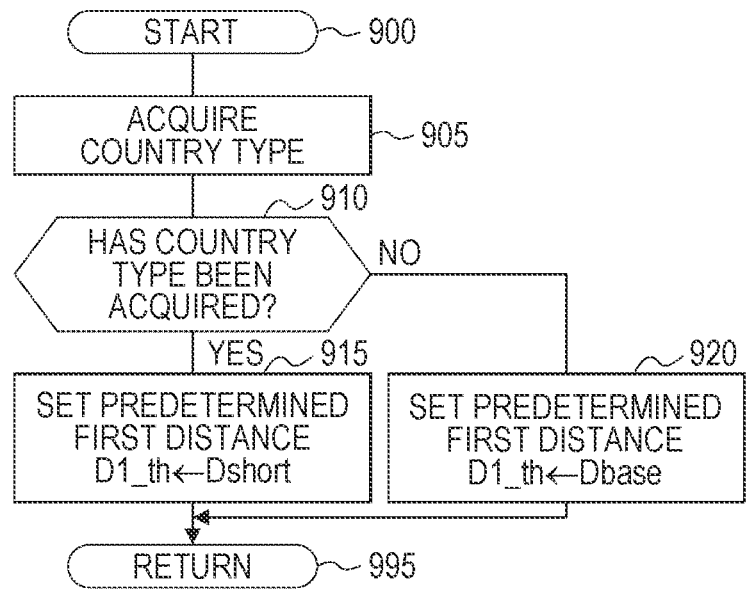
FIG. 9 is a flowchart illustrating a routine which is performed by the vehicle driving support device according to the embodiment of the disclosure.

When the vehicle driving support device 10 is configured to set the predetermined first distance D1_th depending on a country, the CPU performs a routine illustrated in FIG. 9 at predetermined time intervals. In this case, at a predetermined timing, the CPU starts the routine from Step 900 in FIG. 9, causes the routine to proceed to Step 905, and acquires a type of a country in which the host vehicle 100 is traveling. Subsequently, the CPU causes the routine to proceed to Step 910 and determines whether a type of the country has been acquired in Step 905.

When the determination result of Step 910 is "YES," the CPU causes the routine to proceed to Step 915 and selects a distance Dstate corresponding to the country of the type of the country acquired in Step 905 out of distances Dstate stored in advance as predetermined first distances D1_th corresponding to the countries and sets the selected distance Dstate as the predetermined first distance D1_th. Thereafter, the CPU causes the routine to proceed to Step 995 and temporarily ends this routine.

On the other hand, when the determination result of Step 910 is "NO," the CPU causes the routine to proceed to Step 920 and sets a distance Dbase stored in advance as a standard predetermined first distance D1_th as the predetermined first distance D1_th. Thereafter, the CPU causes the routine to proceed to Step 995 and temporarily ends this routine.

Figure 10:
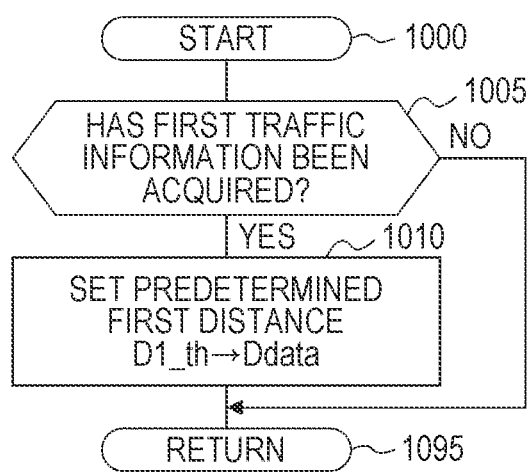
FIG. 10 is a flowchart illustrating a routine which is performed by the vehicle driving support device according to the embodiment of the disclosure.

When the vehicle driving support device 10 is configured to set the predetermined first distance D1_th based on past data of distance intervals at which the first traffic information IF1 is acquired, the CPU performs a routine illustrated in FIG. 10 at predetermined time intervals. In this case, at a predetermined timing, the CPU starts the routine from Step 1000 in FIG. 10, causes the routine to proceed to Step 1005, and determines whether the first traffic information IF1 has been newly acquired by performing the first process in Step 705 in FIG. 7.

When the determination result of Step 1005 is "YES," the CPU causes the routine to proceed to Step 1010 and sets a distance Ddata between a point at which the first traffic information IF1 has been newly acquired in Step 705 in FIG.

7 and a point at which the same type of first traffic information IF1 as the new first traffic information IF1 has been acquired immediately before as the predetermined first distance D1_th. Thereafter, the CPU causes the routine to proceed to Step 1095 and temporarily ends this routine.

On the other hand, when the determination result of Step 1005 is "NO," the CPU causes the routine to proceed directly to Step 1095 and temporarily ends this routine.

The disclosure is not limited to the aforementioned embodiment and can employ various modified examples without departing from the scope of the disclosure.

What is claimed is:

1. A vehicle driving support device comprising:
   an electronic control unit configured to perform driving support of supporting a driver's driving of a host vehicle based on traffic information associated with traveling of the host vehicle; and
   a forward information detecting device that detects forward information of the host vehicle,
   wherein the electronic control unit is configured to:
      perform a first process of acquiring traffic information associated with traveling of the host vehicle at that time as first traffic information from the information detected by the forward information detecting device;
      perform a second process of acquiring traffic information associated with traveling of the host vehicle at that time out of traffic information stored in a database as second traffic information by comparing a current position of the host vehicle with map data stored in the database;
      start, in response to acquiring the first traffic information, the driving support based on the first traffic information,
      continue the driving support based on the first traffic information even when the second traffic information is acquired until a predetermined first condition is satisfied where a traveling distance of the host vehicle or an elapsed time after the first traffic information has been acquired reaches a predetermined value in a state where new first traffic information is not acquired, and
      start, in response to the predetermined first condition being satisfied, the driving support based on the second traffic information.

2. The vehicle driving support device according to claim 1, wherein the electronic control unit is configured not to store the acquired second traffic information even when the second traffic information is acquired through the second process between after the first traffic information has been acquired and until the predetermined first condition is satisfied.

3. The vehicle driving support device according to claim 1, wherein the predetermined value is set to a distance longer when the host vehicle is traveling on an expressway than when the host vehicle is traveling on a general road.

4. The vehicle driving support device according to claim 1, wherein the predetermined value is set to a distance corresponding to a distance between neighboring points at which two pieces of first traffic information of the same type have been acquired.

5. The vehicle driving support device according to claim 1, wherein the electronic control unit is configured to end the driving support based on the second traffic information when a predetermined second condition is satisfied, the predetermined second condition is a condition where the traveling distance of the host vehicle or an elapsed time after the second traffic information has been acquired reaches a second predetermined value in a state where new second traffic information is not acquired.

6. The vehicle driving support device according to claim 1, wherein the electronic control unit is configured to:
   determine that the first traffic information, detected by the forward information detecting device, corresponds to a first road sign indicating a first speed limit, and
   cause an image display device to display the first speed limit.

7. The vehicle driving support device according to claim 6, wherein the electronic control unit is configured to:
   receive, from a car navigation system, a first data speed limit stored in a map database of the car navigation system in response to the host vehicle passing a first predefined point,
   determine whether a traveling distance of the host vehicle from a point where the forward information detecting device detected the first road sign indicating the first speed limit satisfies a predetermined first distance,
   in response to the traveling distance satisfying the predetermined first distance, cause the image display device to display the first data speed limit, and
   in response to the traveling distance not satisfying the predetermined first distance, cause the image display device to maintain display of the first speed limit.

8. The vehicle driving support device according to claim 7, wherein the electronic control unit is configured to:
   subsequent to the traveling distance satisfying the predetermined first distance and the image display device caused to display the first data speed limit:
      receive, from the car navigation system, a second data speed limit stored in the map database in response to the host vehicle passing a second predefined point, and
      cause the image display device to switch display of the first data speed limit to display of the second data speed limit.

9. The vehicle driving support device according to claim 7, wherein the electronic control unit is configured to:
   subsequent to the traveling distance satisfying the predetermined first distance and display of the first data speed limit on the image display device:
      determine whether a traveling distance of the host vehicle from the first predefined point satisfies a predetermined second distance, and
      in response to the traveling distance satisfying the predetermined second distance, cause the image display device to remove display of the first data speed limit, such that the image display device does not display a speed limit.

10. The vehicle driving support device according to claim 6, wherein the electronic control unit is configured to:
    subsequent to the forward information detecting device detecting the first road sign indicating the first speed limit, receive from the forward information detecting device information corresponding to a second road sign indicating a second speed limit, and
    cause the image display device to display the second speed limit.

11. A vehicle driving support method of performing driving support of supporting a driver's driving of a host vehicle based on traffic information associated with traveling of the host vehicle, the vehicle driving support method comprising:
    a step of detecting forward information of the host vehicle and performing a first process of acquiring traffic information associated with traveling of the host vehicle at that time as first traffic information from the detected information;

a step of performing a second process of acquiring traffic information associated with traveling of the host vehicle at that time out of traffic information stored in a database as second traffic information by comparing a current position of the host vehicle with map data stored in the database;

a step of starting, in response to acquiring the first traffic information, the driving support based on the first traffic information, a step of continuing the driving support based on the first traffic information even when the second traffic information is acquired until a predetermined first condition is satisfied where a traveling distance of the host vehicle or an elapsed time after the traffic information has been acquired reaches a predetermined value in a state where new first traffic information is no acquired, and a step of starting, in response to the predetermined first condition being satisfied, the driving support based on the second traffic information.

12. A vehicle driving support computer program product comprising machine-readable instructions stored on a non-transitory computer readable memory, which when executed by an electronic control unit, causes the electronic control unit to perform the vehicle driving support method according to claim 11.

13. The vehicle driving support method of claim 11, further comprising a step of ending the driving support based on the second traffic information when a predetermined second condition is satisfied, the predetermined second condition is a condition where the traveling distance of the host vehicle or an elapsed time after the second traffic information has been acquired reaches a second predetermined value in a state where new second traffic information is not acquired.

14. The vehicle driving support method according to claim 11, further comprising:
a step of determining that the first traffic information, detected by the forward information detecting device, corresponds to a first road sign indicating a first speed limit, and
a step of causing an image display device to display the first speed limit.

15. The vehicle driving support method according to claim 14, further comprising:
a step of receiving, from a car navigation system, a first data speed limit stored in a map database of the car navigation system in response to the host vehicle passing a first predefined point,
a step of determining whether a traveling distance of the host vehicle from a point where the forward information detecting device detected the first road sign indicating the first speed limit satisfies a predetermined first distance,
in response to the traveling distance satisfying the predetermined first distance, a step of causing the image display device to display the first data speed limit, and
in response to the traveling distance not satisfying the predetermined first distance, a step of causing the image display device to maintain display of the first speed limit.

16. The vehicle driving support method according to claim 15, further comprising:
subsequent to the traveling distance satisfying the predetermined first distance and the image display device caused to display the first data speed limit:
a step of receiving, from the car navigation system, a second data speed limit stored in the map database in response to the host vehicle passing a second predefined point, and
a step of causing the image display device to switch display of the first data speed limit to display of the second data speed limit.

17. The vehicle driving support method according to claim 15, further comprising:
subsequent to the traveling distance satisfying the predetermined first distance and display of the first data speed limit on the image display device:
a step of determining whether a traveling distance of the host vehicle from the first predefined point satisfies a predetermined second distance, and
in response to the traveling distance satisfying the predetermined second distance, a step of causing the image display device to remove display of the first data speed limit, such that the image display device does not display a speed limit.

18. The vehicle driving support method according to claim 14, further comprising:
subsequent to the forward information detecting device detecting the first road sign indicating the first speed limit:
a step of receiving from the forward information detecting device information corresponding to a second road sign indicating a second speed limit, and
a step of causing the image display device to display the second speed limit.

* * * * *